United States Patent [19]

Iwamoto et al.

[11] Patent Number: 5,499,832
[45] Date of Patent: Mar. 19, 1996

[54] WHEEL SUPPORT STRUCTURE AND METHOD OF INSTALLING WHEELS IN MOTOR VEHICLE

[75] Inventors: Fumiya Iwamoto; Masahito Nakayama; Yoshiyuki Matsumoto, all of Wako, Japan

[73] Assignee: Honda Giken Kogyo Kabushiki Kaisha, Tokyo, Japan

[21] Appl. No.: 461,543

[22] Filed: Jun. 5, 1995

Related U.S. Application Data

[63] Continuation of Ser. No. 215,843, Mar. 22, 1994, abandoned.

[30] Foreign Application Priority Data

May 18, 1993 [JP] Japan ..................... 5-139003

[51] Int. Cl.⁶ ................ B60B 27/02; F16C 19/08; F16C 33/60
[52] U.S. Cl. ............. 280/96.1; 301/105.1; 384/504; 384/506; 384/540; 384/544
[58] Field of Search ................... 384/506, 505, 384/504, 499, 544, 540, 543, 546; 301/105.1, 131, 124.1; 280/96.1, 93

[56] References Cited

U.S. PATENT DOCUMENTS

| | | | |
|---|---|---|---|
| 1,379,945 | 5/1921 | Teetsow | 384/506 |
| 2,037,982 | 4/1936 | Hughes | 384/506 |
| 2,121,237 | 6/1938 | Smith | 384/504 |
| 2,651,554 | 9/1953 | Recknagel | 384/504 |
| 3,157,442 | 11/1964 | Gaubatz | 384/544 |
| 4,783,182 | 11/1988 | Caron et al. | 384/504 |
| 4,865,468 | 9/1989 | Kato et al. | 384/506 |

FOREIGN PATENT DOCUMENTS

| | | | |
|---|---|---|---|
| 0369784 | 1/1907 | France | 384/540 |
| 62-52002 | 3/1987 | Japan . | |
| 63-24424 | 2/1988 | Japan . | |
| 2-299902 | 12/1990 | Japan | 301/105.1 |
| 0861779 | 9/1981 | U.S.S.R. | 384/506 |
| 2241290 | 8/1991 | United Kingdom | 384/504 |

Primary Examiner—Margaret A. Focarino
Assistant Examiner—Peter C. English
Attorney, Agent, or Firm—Armstrong, Westerman, Hattori, McLeland & Naughton

[57] ABSTRACT

A wheel support structure of a motor vehicle wherein a double angular bearing 11 is constituted of an outer race 12 integrally installed in one of such members as a hub 9 on which a wheel is mounted and a knuckle 3 to which a suspension arm is installed, inner races 14a and 14b installed in the other, and double rows of balls 13a and 13b inserted between the races; and a lock nut 15 is tightened to compress the inner races 14a and 14b in an axial direction. There is formed a clearance between the inner races 14a and 14b in a no-load condition. The bearing thus constituted is provided with a large rigidity to thereby improve the steering stability of the motor vehicle.

2 Claims, 4 Drawing Sheets

WHEEL SUPPORT STRUCTURE AND METHOD OF INSTALLING WHEELS IN MOTOR VEHICLE

This application a continuation of application Ser. No. 08/215,843 filed Mar. 22, 1994, now abandoned.

BACKGROUND OF THE INVENTION

1. Field of the Invention

The present invention relates to a wheel support structure using a double angular bearing, and a method of installing wheels particularly for motor vehicles.

2. Description of the Related Art

A wheel support structure using a double angular bearing for motor vehicles has been disclosed in, for example, Japanese Utility Model Laid-Open No. Sho 62-52002. The double angular bearing consists of an outer race fitted on the inner peripheral surface of a knuckle, an inner race fitted on the outer peripheral surface of an axle hub, and two rows of balls interposed between both races. The balls in each row are arranged between an arcuate shoulder section provided at the center of the outer race and an arcuate shoulder section provided on the outer end side of the inner race, so that both a radial load and a bidirectional thrust load may be supported. The inner race consists of two members split in an axial direction for convenience of assembling, which are assembled in contact with each other.

A similar double angular bearing has also been disclosed n Japanese Utility Model Laid-Open No. Sho 63-24424.

The split members of the inner race are tightened by a lock nut into one body. In the prior-art bearing, these two inner races are held in contact with each other when in a no-load condition, that is, when free from the tightening force of the lock nut, so that the balls will not be excessively preloaded with the tightening force.

For the purpose of improving the steering stability of a motor vehicle, improvements have been made on suspensions, etc. In this connection, it is essential to solve a problem of rigidity of the wheel support structure, and particularly it is highly desired to increase the rigidity of the double angular bearing with respect to the input of moment.

In order therefore to increase the rigidity of the bearing, there is generally adopted a method to change specifications of bearing balls. This method, however, increases the size of the bearing, imposing a restriction on bearing arrangement. It is therefore difficult to realize the improvement in the rigidity of the bearing by the method.

SUMMARY OF THE INVENTION

Noticing a correlation between the amount of preload applied to bearings after installation and the rigidity of the bearings, the present invention has realized the improvement on the rigidity of the bearings of the same size by increasing the amount of preload after installation.

That is, the present invention provides a wheel support structure, in which an outer race is integrally installed in either a hub on which a wheel is installed or a knuckle to which a suspension arm is installed; double inner races are provided in the other of the hub or knuckle; between the outer and inner races is formed a double angular bearing through double rows of balls; and the double inner races are axially compressed by a lock nut. And between the inner races is provided a clearance when the bearing is free from load.

According to the present invention, the inner races can be tightened by the lock nut by the amount of the clearance provided between the inner races in the initial period of installation of the bearing, thereby applying a great preload to the balls between the outer race and the inner race and accordingly largely increasing the rigidity of the bearing. The bearing rigidity, therefore, can easily be improved without changing bearing size.

The foregoing and other objects and advantages of the present invention will become apparent from the following detailed description, taken in connection with the accompanying drawings.

DESCRIPTION OF THE PREFERRED EMBODIMENT

Figure 1:
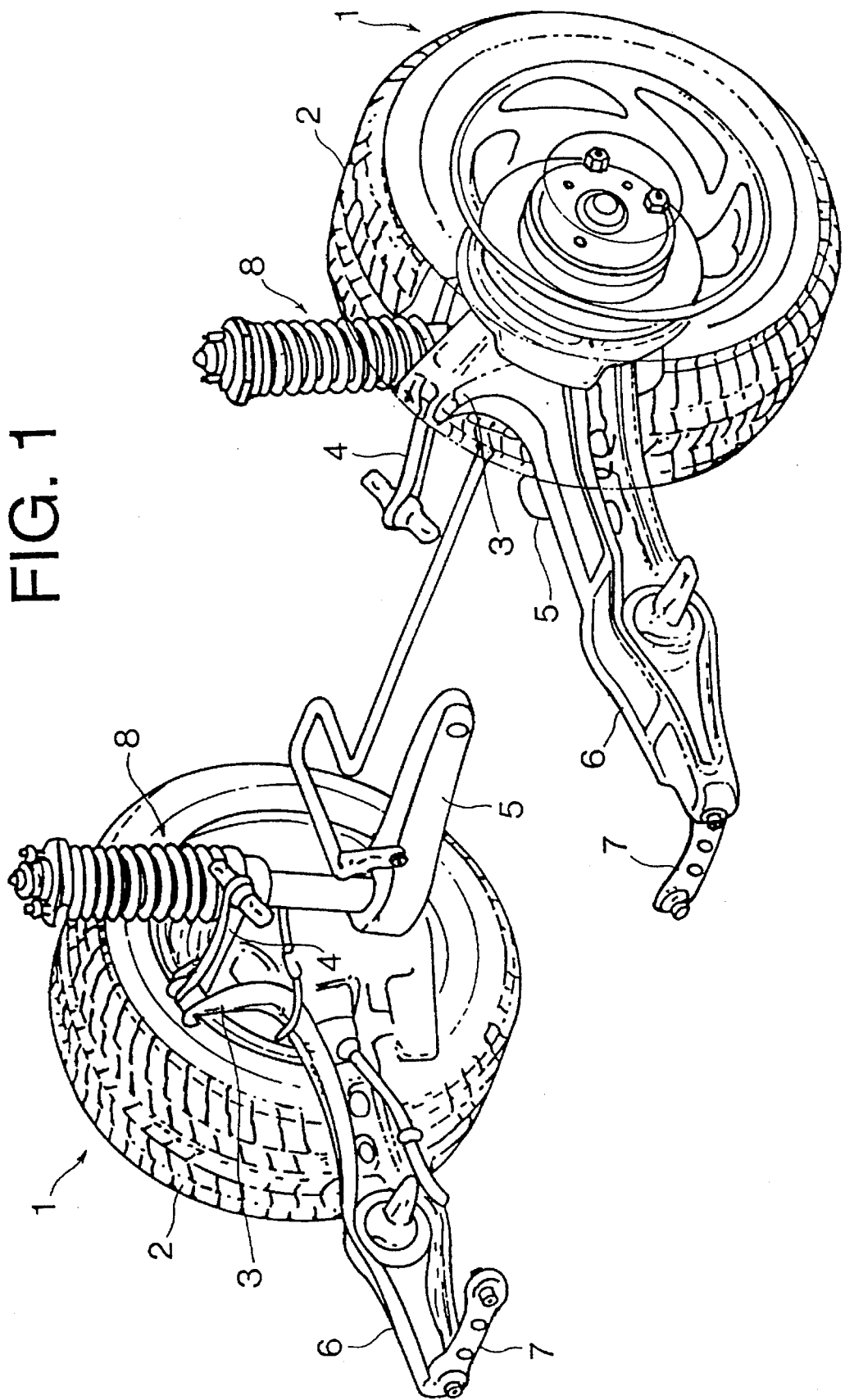
FIG. 1 is a perspective view showing the rear wheel support structure of a motor vehicle according to the present invention.

FIG. 1 is a perspective view showing the rear wheel support structure of a motor vehicle according to the present invention. The general construction of this rear wheel support structure makes no difference from general, conventional ones. In FIG. 1 a reference numeral 1 denotes a wheel having a tire 2, and a reference numeral 3 is a knuckle. To the knuckle 3 are connected a suspension arm, or an upper arm 4, a lower arm 5, and a trailing arm 6. On the forward end of the trailing arm 6 extending forwardly from the knuckle 3 is provided a compensator arm 7. The lower arm 5 is fitted with a cushion unit 8.

Figure 2:
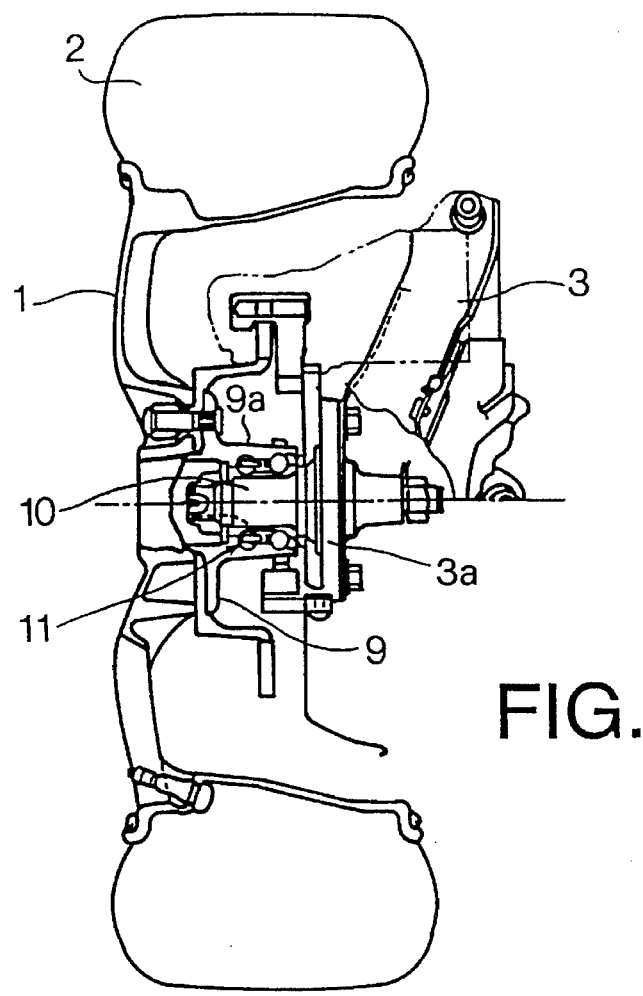
FIG. 2 is a sectional view of a major portion of the support structure.

The wheel 1, as shown in FIG. 2, is installed to the hub 9. In a cylindrical boss 9a of the hub 9, a spindle 10 projectingly provided on a base plate 3a of the knuckle 3 is inserted. And a bearing 11 is interposed between the inner peripheral surface of the boss 9a and the outer peripheral surface of the spindle 10, thereby rotatably supporting the wheel 1 on the vehicle body through the knuckle 3.

Figure 3:
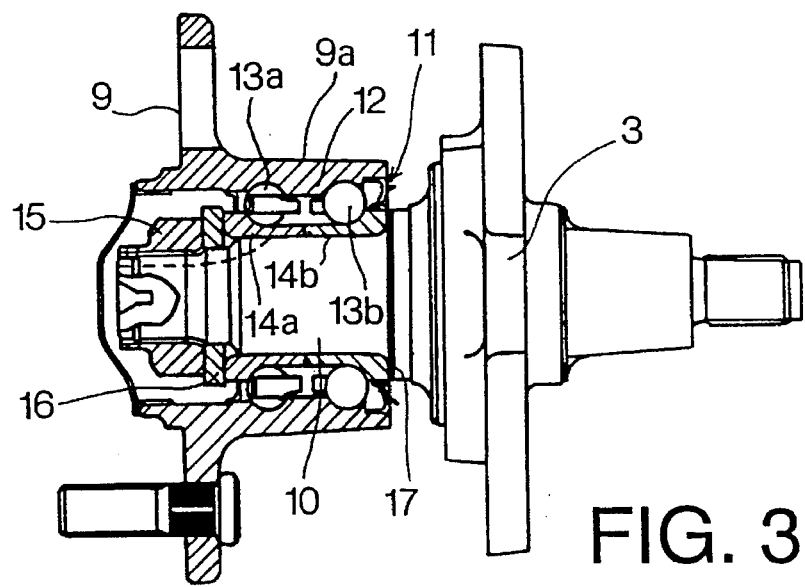
FIG. 3 is a partly enlarged view of FIG. 2.

FIG. 3 is a further enlarged sectional view of the vicinity of the bearing 11. The bearing 11 is a double angular bearing consisting of an outer race 12, two rows of balls 13a and 13b, and two inner races 14a and 14b. The outer race 12 is formed integrally with the inner peripheral section of the boss 9a of the hub 9. The inner races 14a and 14b are inserted on the spindle 10 with the opposite end faces held in contact with each other, are pressed by a spindle nut (lock nut) 15 installed on the forward end of the spindle 10 through a thrust plate 16, and are tightened between the thrust plate 16 and the shoulder section 17 provided on the base of the spindle 10.

Figure 4A:
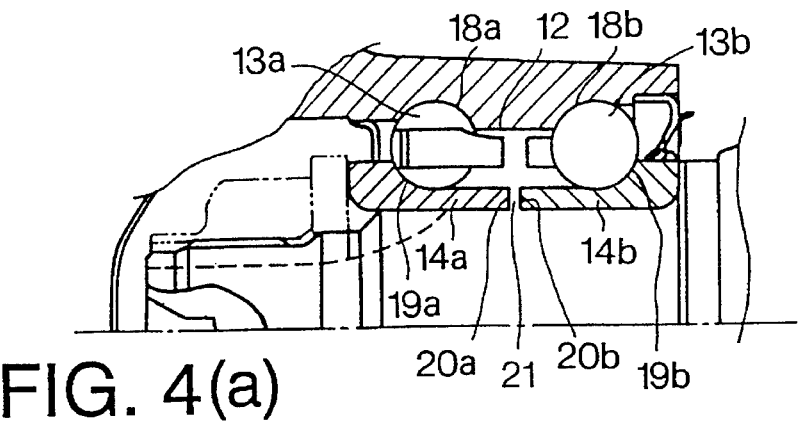
FIGS. 4(a) and 4(b) are views for explaining a bearing installation process.

The balls 13a and 13b are retained from radial movement by means of the outer race 12 and the inner races 14a and 14b, and, at the same time, from axial movement by means of the arcuate shoulder sections 18a and 18b provided on the outer race 12 and the arcuate shoulder sections 19a and 19b provided on the inner races 14a and 14b respectively (FIGS. 4(a) and (b)), thus constituting the double angular bearing that is capable of supporting both the radial load and the bidirectional thrust load.

The bearing 11 is installed, for example, by pushing the inner races 14a and 14b from opposite side of the outer race 12, while holding the corresponding balls 13a or 13b between the outer race 12 and the inner races 14a and 14b. The spindle 10 without the spindle nut 15 and the thrust plate 16, is inserted into the inner races 14a and 14b. The spindle nut 15 and the thrust plate 16, are installed on the projecting outer end of spindle 10". By tightening the spindle nut 15 the outer race 14a and inner race 14b are fixed between the thrust plate 16 and the shoulder section 17.

FIG. 4(a) shows the initial state of the bearing structure in the process of installation, that is, the state of the bearing structure with the spindle 10 inserted in the races 14a and 14b which are not tightened yet by the spindle nut 15 and the thrust plate 16. At this time, the balls 13a and 13b are in contact with the shoulder sections 18a and 19a and the shoulder sections 18b and 19b, but the end faces 20a and 20b of the inner races 14a and 14b are not in contact with each other. There is left a clearance 21 between the end faces 20a and 20b. This clearance 21 is small and has accurately been set to a specific value.

Figure 4B:
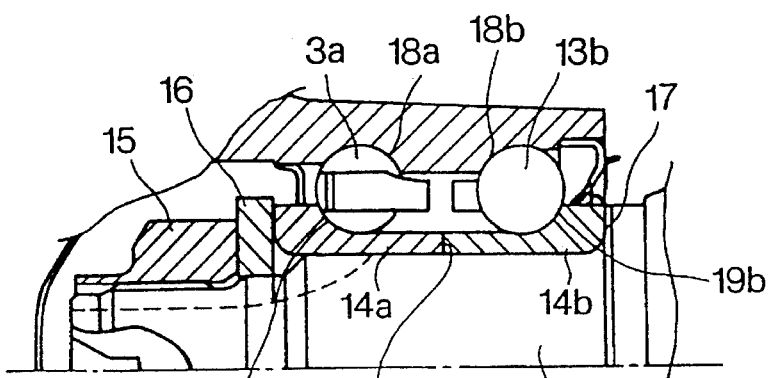

The inner races 14a and 14b, when tightened from this state by the spindle nut 15 between the thrust plate 16 and the shoulder section 17, approach each other until the end faces 20a and 20b come into contact with each other as shown in FIG. 4(b). At this time the balls 13a and 13b are pressed obliquely between the shoulder sections 18a and 19a and between the shoulder sections 18b and 19b, respectively Consequently, the balls 13a and 13b are applied with preloads in both axial and radial directions.

The bearing 11 can be improved, largely in rigidity, by giving a specific preload to the balls 13a and 13b after the installation of the bearing. The clearance 21 described above has been set accurately to provide the specific value of preload.

Figure 5:
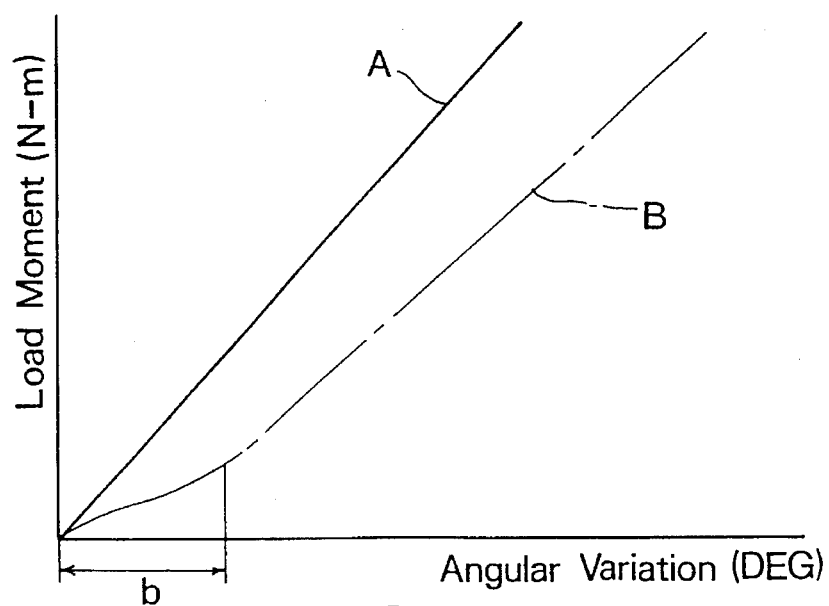
FIG. 5 is a graph showing a result of rigidity comparison tests of the bearing.

FIG. 5 is a graph showing a result of comparison of rigidity between the bearing 11 and a conventional double angular bearing of the same size, giving a load moment on the ordinate and the angular variation of the bearing by the load moment on the abscissa. In this drawing, the solid line A indicates a result of tests conducted on the bearing 11, and the broken line B indicates a result of tests conducted on the conventional bearing.

As seen from the drawing, the angular variation by the same load moment of the bearing 11 is much smaller than that of the conventional bearing. That is, the bearing 11 has extremely high rigidity as compared with the conventional bearing. Furthermore, in the conventional bearing, there exists a low-rigidity range b where the angular variation is particularly large with respect to the load moment, but in the bearing 11 there is no such low-rigidity range. The bearing 11 has a linear characteristic throughout.

Increasing the rigidity of the bearing 11 largely improves the steering stability of the vehicle. Hereinafter the relation between the bearing rigidity and the steering stability will be outlined.

The motor vehicle, as is commonly known, starts cornering when the driver turns front wheels to give a slip angle to front tires for thereby producing a cornering force. The vehicle body tends to yaw due to a yawing moment caused by the cornering force, but at this time, however, a slip angle has not occurred yet at the rear wheel tires and accordingly no cornering force is present.

The rear wheels at the next stage tend to deviate outward from the direction of travel of the motor vehicle, and a slip angle occurs at the rear wheel tires, thus producing a cornering force. Where the resultant cornering force by the front and rear wheels is balanced with a centrifugal force acting on the center of gravity of the vehicle body, a transient range is over, and thereafter the motor vehicle turns with stability. Therefore, the turning stability of the motor vehicle depends on how linearly, rapidly and largely the cornering force of the rear wheels are raised.

Therefore, in the present embodiment shown in FIG. 1, an appropriate spring rate is selected for a bushing between the trailing arm 6 and the compensator arm 7 and for a bushing between the steering knuckle 3 and the lower arm 5, so that the rear wheels will turn with toe-in relative to the vehicle body at the transient range from the beginning of steering to the beginning of stable turning, because the suspension side receives a side force resulting from the cornering force gradually occurring at the rear wheels.

Figure 6:
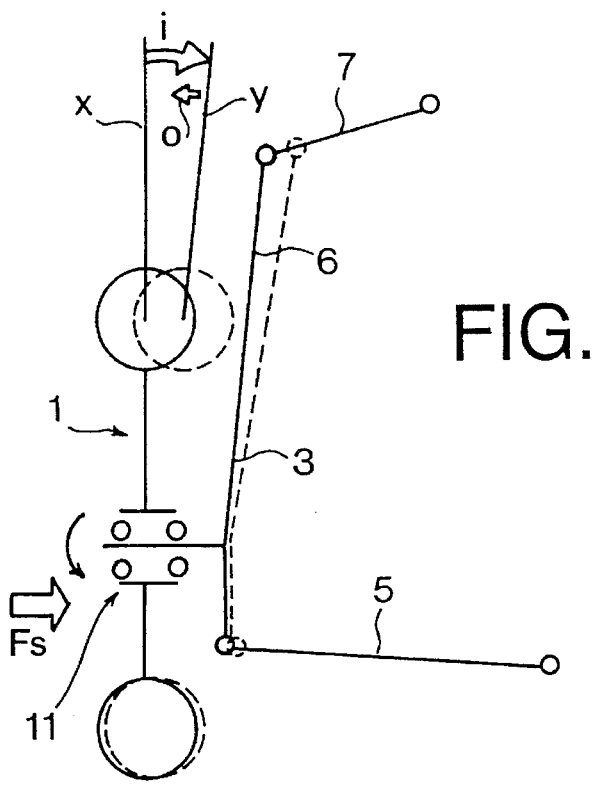
FIG. 6 is an explanatory diagram showing a rear wheel support structure viewed from above.

That is, in FIG. 6 which is a schematic top view of the wheel support structure of FIG. 1, the knuckle 3 formed integrally with the trailing arm 6 is inclined with the side force Fs as indicated by a dotted line, and therefore the direction of the wheel 1 changes to a direction y in which the wheel 1 deflects inward of rotation from a direction x parallel to the centerline of the vehicle body as indicated by an arrow i, thereby consequently enabling the linear, rapid, larger rise of the cornering force of the wheel 1.

The side force will not act on the tire center point but will act on the rear of the tire center because of a pneumatic trail, and therefore a moment in the direction of toe-out as indicated by the arrow O acts around the bearing 11 of the wheel 1 which toes in toward the direction of y. Therefore, if the rigidity of the bearing 11 is low, the wheel 1 tends to toe out as compared with the toe-in state shown in the direction of y, resulting in lowered turning stability due to a delayed rise of the corner force or in a defective linearity of the rise in a low-rigidity range b in FIG. 5. In the present embodiment, however, because the rigidity of the bearing 11 is high, as described above, the wheel support structure is able to obtain extremely good stability without being subjected to the trouble stated above.

Figure 7:
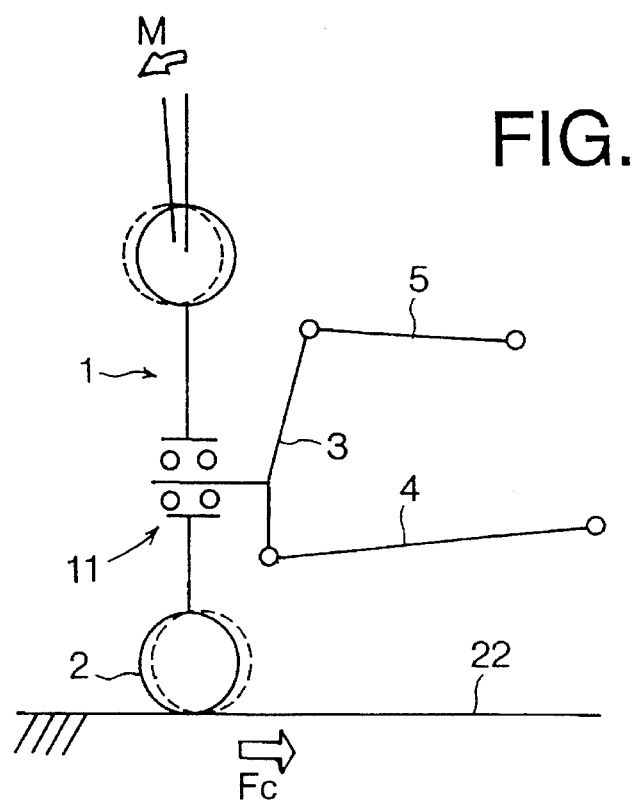
FIG. 7 is an explanatory diagram showing the rear wheel support structure viewed from rear.

Because the vehicle body rolls on cornering in the present embodiment, the wheel 1 accordingly has positive camber, tilted further out in relation to the road surface 22 as indicated by a dotted line in FIG. 7, thus diminishing the cornering force Fc. In the present embodiment, therefore, the wheel 1 has been so designed as to reduce the camber relative to the road to zero as indicated by a solid line in FIG. 7 even during rolling by having mounting angles and lengths of the lower arm 5 and the upper arm 4 different from each other.

The cornering force Fc is produced at a portion of the tire 2 contacting with the road surface 22, and, accordingly, causes a moment M around the bearing 11 to act on the wheel 1, to thereby incline the wheel 1 to a positive camber relative to the road surface as indicated by a dotted line. The bearing 11, however, having a high rigidity as previously stated, can fully withstand this moment, holding the wheel 1 at about zero camber indicated by a solid line and consequently obtaining a large cornering force Fs.

As is seen from the above explanation, it is possible to remarkably improve the steering stability of the motor vehicle by increasing the rigidity of the bearing 11.

In the present embodiment described above, the outer race 12 is formed integrally with the hub 9. It should be noted, however, that a separate outer race may be pressed in and fixed in the hub, or the inner race may be installed on the hub side and the outer race on the knuckle side. Furthermore, the present invention is applicable to a driving wheel support structure and a wheel support structure using a taper roller-type bearing.

According to the present invention, therefore, it is possible to increase the rigidity of the bearing in the wheel support structure of the motor vehicle without a restriction on bearing arrangement and to thereby largely improve the steering stability of the motor vehicle.

What is claimed:

1. A wheel support structure wherein a double angular bearing is composed of an outer race integrally mounted in one of a hub on which a wheel is mounted and a knuckle to which a suspension arm is installed, double inner races mounted on the other of said hub and said knuckle and balls arranged in double rows between said races, said balls initially being seated in said races with a clearance between abutting ends of said double inner races so that initially said balls and said double inner races are not axially compressed but are subsequently axially compressed by a lock nut threaded on a spindle upon which said other of said hub and said knuckle are mounted.

2. A method of installing a wheel on a motor vehicle comprising steps of:

integrally mounting an outer race of a double angular bearing on one of a hub of said wheel or a knuckle for said wheel to which a suspension arm is installed;

fitting double inner races arranged in an axial direction on said double angular bearing having a clearance between opposite end faces of said inner races in said outer race with double rows of balls interposed in a no load condition between said inner and outer races and seated in said races;

inserting a spindle for supporting said wheel in said double inner races; and tightening said double inner races against each other in said axial direction on said spindle with a lock nut threaded on said spindle to thereby apply a radial preload to said outer race, said balls and said inner races.

* * * * *